United States Patent
Welch

(10) Patent No.: US 11,359,846 B2
(45) Date of Patent: Jun. 14, 2022

(54) REFRIGERATION SYSTEM LEAK DETECTION

(71) Applicant: Emerson Climate Technologies, Inc., Sidney, OH (US)

(72) Inventor: Andrew M. Welch, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 16/921,535

(22) Filed: Jul. 6, 2020

(65) Prior Publication Data
US 2022/0003471 A1    Jan. 6, 2022

(51) Int. Cl.
F25B 49/02    (2006.01)
F25B 49/00    (2006.01)
F25D 29/00    (2006.01)
F24F 11/36    (2018.01)

(52) U.S. Cl.
CPC ............ F25B 49/005 (2013.01); F24F 11/36 (2018.01); F25D 29/008 (2013.01); F25B 2500/222 (2013.01)

(58) Field of Classification Search
CPC .. F24F 11/36; F25B 2500/22; F25B 2500/222
See application file for complete search history.

(56) References Cited

U.S. PATENT DOCUMENTS

| | | |
|---|---|---|
| 5,357,781 A | 10/1994 | Tikijian |
| 5,820,262 A | 10/1998 | Lechner |
| 6,644,047 B2 | 11/2003 | Taira et al. |
| 6,655,161 B1 | 12/2003 | Koo |
| 6,701,722 B1 | 3/2004 | Seo et al. |
| 6,772,598 B1 | 8/2004 | Rinehart |
| 6,791,088 B1 | 9/2004 | Williams, II et al. |
| 6,973,794 B2 | 12/2005 | Street et al. |
| 7,197,914 B2 | 4/2007 | Maresca, Jr. et al. |

(Continued)

FOREIGN PATENT DOCUMENTS

| | | |
|---|---|---|
| CN | 101107486 B | 6/2010 |
| CN | 108488916 A | 9/2018 |

(Continued)

OTHER PUBLICATIONS

Examiner-Initiated Interview Summary regarding U.S. Appl No. 16/940,843 dated Feb. 5, 2021.

(Continued)

*Primary Examiner* — Jonathan Bradford
(74) *Attorney, Agent, or Firm* — Harness, Dickey & Pierce, P.L.C.

(57) ABSTRACT

A refrigeration system includes: a leak sensor disposed within a building and configured to measure an amount of refrigerant that has leaked from the refrigeration system within the building; an estimation module configured to determine an estimated amount of refrigerant that has leaked from the refrigeration system within the building based on the measured amount; and a leak module configured to: determine whether a leak is present in the refrigeration system within the building based on the estimated amount of refrigerant that has leaked from the refrigeration system; and take one or more remedial actions when a leak is present in the refrigeration system within the building.

20 Claims, 4 Drawing Sheets

(56) References Cited

U.S. PATENT DOCUMENTS

| | | |
|---|---|---|
| 7,814,757 B2 | 10/2010 | Zima et al. |
| 8,899,099 B2 | 12/2014 | Grosse Bley et al. |
| 8,924,026 B2 | 12/2014 | Federspiel et al. |
| 9,222,711 B2 | 12/2015 | Ochiai et al. |
| 9,625,195 B2 | 4/2017 | Hiraki et al. |
| 9,933,205 B2 | 4/2018 | Hatomura et al. |
| 10,047,990 B2 | 8/2018 | Marshall et al. |
| 10,354,332 B2 | 7/2019 | Trainor et al. |
| 10,514,176 B2 | 12/2019 | Weinert |
| 10,533,764 B2 | 1/2020 | Yamada et al. |
| 10,569,620 B2 | 2/2020 | Vehr et al. |
| 10,571,171 B2 | 2/2020 | Gariety et al. |
| 2005/0263394 A1 | 12/2005 | Lewis et al. |
| 2011/0112814 A1 | 5/2011 | Clark |
| 2012/0180506 A1 | 7/2012 | Ochiai et al. |
| 2012/0318011 A1 | 12/2012 | Ochiai et al. |
| 2013/0233006 A1* | 9/2013 | Morimoto ............... F25B 9/008 62/126 |
| 2015/0159931 A1 | 6/2015 | Okada et al. |
| 2016/0178229 A1 | 6/2016 | Chen et al. |
| 2017/0268811 A1 | 9/2017 | Ochiai et al. |
| 2017/0284718 A1 | 10/2017 | Suzuki et al. |
| 2019/0056133 A1 | 2/2019 | Green et al. |
| 2019/0170599 A1 | 6/2019 | Kester |
| 2019/0170603 A1 | 6/2019 | Gupte et al. |
| 2019/0170604 A1 | 6/2019 | Kester |
| 2019/0195550 A1* | 6/2019 | Sakae .................... F25B 13/00 |
| 2019/0226705 A1 | 7/2019 | Sakae et al. |
| 2019/0242632 A1 | 8/2019 | Sakae et al. |
| 2019/0301780 A1 | 10/2019 | Schmidt et al. |
| 2019/0331377 A1 | 10/2019 | Matsuda et al. |
| 2019/0368752 A1 | 12/2019 | Shiohama et al. |
| 2019/0390876 A1 | 12/2019 | Matsuda et al. |
| 2020/0011580 A1 | 1/2020 | Matsuda. et al. |
| 2020/0124306 A1 | 4/2020 | Kowald et al. |
| 2020/0182734 A1 | 6/2020 | Ueno et al. |
| 2020/0248919 A1 | 8/2020 | Green et al. |
| 2020/0318840 A1 | 10/2020 | Wada et al. |
| 2020/0324624 A1 | 10/2020 | Repice et al. |

FOREIGN PATENT DOCUMENTS

| | | |
|---|---|---|
| CN | 108763721 A | 11/2018 |
| CN | 110500708 A | 11/2019 |
| EP | 1970651 A1 | 9/2008 |
| EP | 3051236 A1 | 8/2016 |
| EP | 3287720 A1 | 2/2018 |
| EP | 3358278 A1 | 8/2018 |
| EP | 3418655 A1 | 12/2018 |
| EP | 1970651 B1 | 7/2019 |
| EP | 3604981 A1 | 2/2020 |
| GB | 2555256 B | 9/2020 |
| JP | 6333481 B2 | 5/2018 |
| KR | 20150012947 A | 2/2015 |
| KR | 101989752 B1 | 6/2019 |
| WO | WO-2013183414 A1 | 12/2013 |
| WO | WO-2017058997 A1 | 4/2017 |
| WO | WO-2019150462 A1 | 8/2019 |

OTHER PUBLICATIONS

U.S. Appl. No. 16/988,269, filed Aug. 7, 2020, Brian R. Butler.
U.S. Appl. No. 16/940,808, filed Jul. 28, 2020, Brian R. Butler.
U.S. Appl. No. 16/940,843, filed Jul. 28, 2020, Brian R. Butler.
Danfoss Application Guide: "Gas Detection in Refrigeration Systems", 2018.
Feng, Shaobin, et al. "Review on Smart Gas Sensing Technology," MDPI Journal on Sensors 2019; Basel Switzerland, Published Aug. 30, 2019.
Islam, Tarikul and Mukjopadhyay, S.C.; "Linearization of the Sensors Characteristics: a review", Exeley International Journal on Smart Sensing and Intelligent Systems Article DOI 10.21307/ijssis-2019-007; Isue 1 vol. 12; 2019.
Nevanda Nano: "Leak Detection Technologies for A2L Refrigerants in HVACR Equipment: Summary of AHRTI Final Report Findings" SM-AN-0012-02.
Final Office Action regarding U.S. Appl. No. 16/940,843 dated Mar. 18, 2021.
Applicant-Initiated Interview Summary regarding U.S. Appl. No. 16/940,843 dated May 4, 2021.
Notice of Allowance regarding U.S. Appl. No. 16/940,843 dated Jun. 7, 2021.
International Search Report for Application No. PCT/2021/040520 dated Oct. 29, 2021.
Written Opinion of the ISA regarding Application No. PCT/US2021/040520 dated Oct. 29, 2021.

* cited by examiner

REFRIGERATION SYSTEM LEAK DETECTION

FIELD

The present disclosure relates to heating ventilation and air conditioning (HVAC) and other types of refrigeration systems and more particularly to a refrigeration leak detection system and method for an HVAC or refrigeration system.

BACKGROUND

This section provides background information related to the present disclosure which is not necessarily prior art.

Refrigeration and air conditioning applications are under increased regulatory pressure to reduce the global warming potential of the refrigerants they use. In order to use lower global warming potential refrigerants, the flammability of the refrigerants may increase.

Several refrigerants have been developed that are considered low global warming potential options, and they have an ASHRAE (American Society of Heating, Refrigerating and Air-Conditioning Engineers) classification as A2L, meaning mildly flammable. The UL (Underwriters Laboratory) 60335-2-40 standard, and similar standards, specifies a predetermined (M1) level for A2L refrigerants and indicates that A2L refrigerant charge levels below the predetermined level do not require leak detection and mitigation.

SUMMARY

This section provides a general summary of the disclosure and is not a comprehensive disclosure of its full scope or all of its features.

The standards for sensing and mitigation of A2L refrigerants limit the technologies available for refrigerant detection because of the time elapsed between leak release and identification and mitigation of the leak. Leak sensors require time to sense a refrigerant leak and to achieve a signal level representative of a predetermined leak level. Leak sensors have a decay curve upon initial detection of a refrigerant until the leak sensor achieves a signal level that is representative of the refrigerant's concentration level.

Using data from testing performed using a range of sensors, each measurement device has a representative decay curve. Decay curves can be quantified from three or more data points to identify the asymptote of the refrigerant concentration measurement.

The present application involves use of the representative decay curve to estimate the actual refrigerant concentration sooner to enable mitigation at an earlier time that enhances the safety of the system and permits more sensing technologies to meet the sensing requirements.

A refrigeration system includes a refrigeration cycle including a compressor, a condenser, an expansion valve and an evaporator. A refrigerant leak sensor is disposed adjacent to the evaporator and/or other components of the system. A control module receives signals from the refrigerant leak sensor and controls operation of the compressor. The control module stores a plurality of decay curves representative of different actual concentration values and upon receipt of data representing an increasing signal from the refrigerant leak sensor the control module matches the data to a stored decay curve and estimates an actual concentration. If the estimated actual concentration exceeds a predetermined value, the control module inhibits operation of the compressor and can activate additional mitigation devices including activation of isolation valves, a fan, a ventilation system, an air exchange system and lockout devices for preventing operation of any ignition devices in proximity to the refrigeration components.

In a feature, a refrigeration system includes: a leak sensor disposed within a building and configured to measure an amount of refrigerant that has leaked from the refrigeration system within the building; a estimation module configured to determine a estimated amount of refrigerant that has leaked from the refrigeration system within the building based on the measured amount; and a leak module configured to: determine whether a leak is present in the refrigeration system within the building based on the estimated amount of refrigerant that has leaked from the refrigeration system; and take one or more remedial actions when a leak is present in the refrigeration system within the building.

In further features, the estimation module is configured to determine the estimated amount of refrigerant that has leaked from the refrigeration system within the building using an equation that relates multiple of the measured amounts from the leak sensor to the estimated amount of refrigerant that has leaked.

In further features, the multiple measured amounts include at least three measured amounts from at least three different times, respectively.

In further features, the estimation module is configured to determine the estimated amount of refrigerant that has leaked from the refrigeration system within the building using a stored curve that relates at least one measured amount from the leak sensor to the estimated amount of refrigerant that has leaked.

In further features, a selection module is configured to select the stored curve from a plurality of different stored curves.

In further features, the selection module is configured to select the stored curve from the plurality of different stored curved based on an increase in the measured amount of refrigerant that has leaked from the refrigeration system within the building.

In further features, the leak module is configured to determine that a leak is present in the refrigeration system within the building when the estimated amount of refrigerant is greater than a predetermined amount.

In further features, the leak module is configured to turn on a fan disposed within the building when a leak is present in the refrigeration system within the building.

In further features, the leak module is configured to turn off a compressor of the refrigeration system when a leak is present in the refrigeration system within the building.

In further features, the leak module is configured to actuate an interlock device and inhibit ignition by one or more components when a leak is present in the refrigeration system within the building.

In further features, the refrigerant has an American Society of Heating, Refrigerating and Air-Conditioning Engineers (ASHRAE) classification of A2L.

In a feature, a refrigeration method includes: receiving, from a leak sensor disposed within a building, a measured amount of refrigerant that has leaked from a refrigeration system within the building; determining a estimated amount of refrigerant that has leaked from the refrigeration system within the building based on the measured amount; and determining whether a leak is present in the refrigeration system within the building based on the estimated amount of refrigerant that has leaked from the refrigeration system; and executing one or more remedial actions when a leak is present in the refrigeration system within the building.

In further features, the determining the estimated amount includes determining the estimated amount of refrigerant that has leaked from the refrigeration system within the building using an equation that relates multiple of the measured amounts from the leak sensor to the estimated amount of refrigerant that has leaked.

In further features, the multiple measured amounts include at least three measured amounts from at least three different times, respectively.

In further features, the determining the estimated amount includes determining the estimated amount of refrigerant that has leaked from the refrigeration system within the building using a stored curve that relates at least one measured amount from the leak sensor to the estimated amount of refrigerant that has leaked.

In further features, the refrigeration method further includes selecting the stored curve from a plurality of different stored curves.

In further features, the selecting includes selecting the stored curve from the plurality of different stored curved based on an increase in the measured amount of refrigerant that has leaked from the refrigeration system within the building.

In further features, the determining whether a leak is present includes determining that a leak is present in the refrigeration system within the building when the estimated amount of refrigerant is greater than a predetermined amount.

In further features, the executing one or more remedial actions includes turning on a fan disposed within the building when a leak is present in the refrigeration system within the building.

In further features, the executing one or more remedial actions includes at least one of: turning off a compressor of the refrigeration system when a leak is present in the refrigeration system within the building; and actuating an interlock device and inhibit ignition by one or more components when a leak is present in the refrigeration system within the building.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method, processes, and operations described herein are not to be construed as necessarily requiring their performance in the particular order discussed or illustrated, unless specifically identified as an order of performance. It is also to be understood that additional or alternative steps may be employed.

Figure 1:
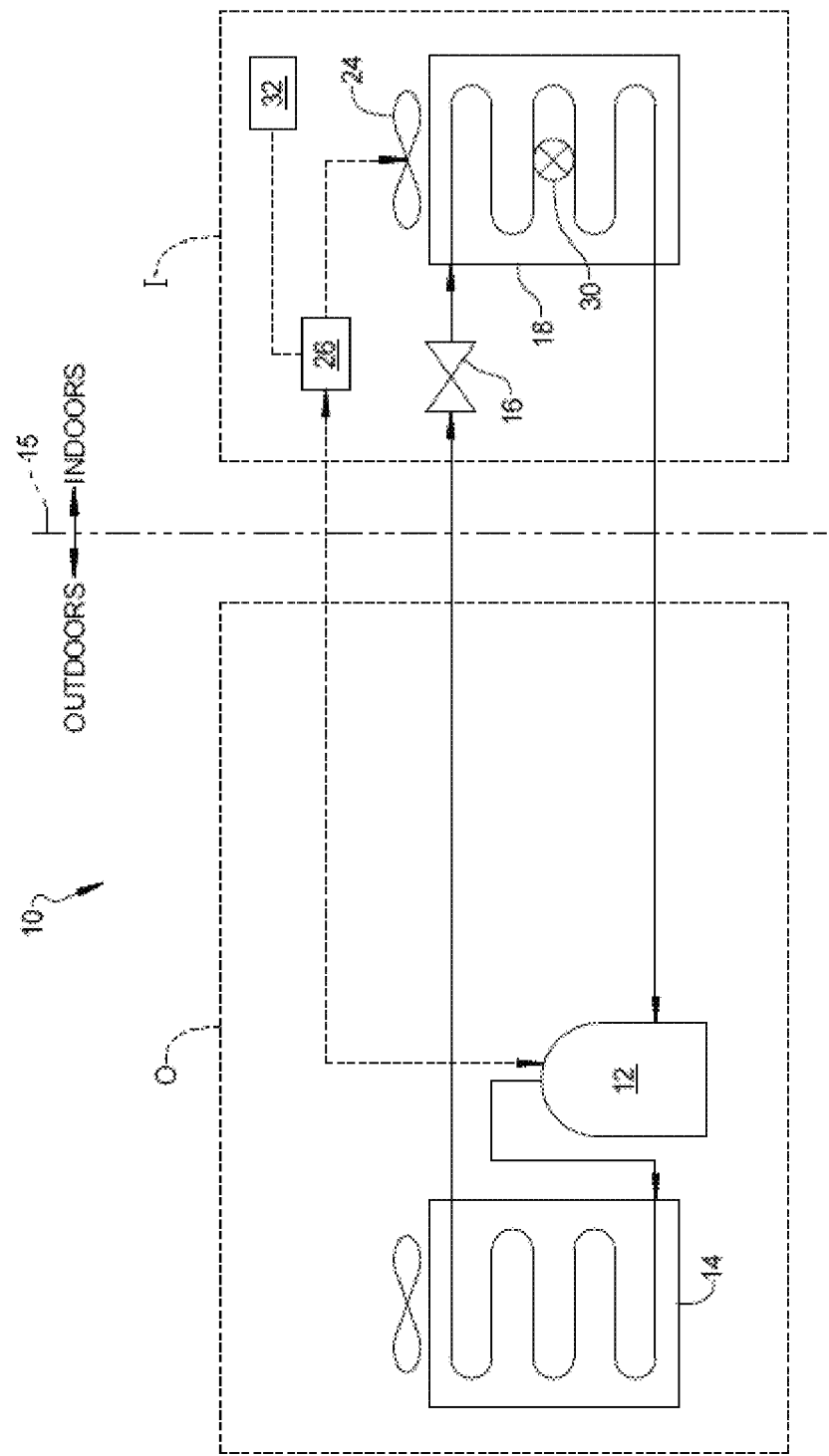
FIG. 1 is a schematic view of an example refrigeration (e.g., air conditioning) system for detecting loss of refrigerant charge using a leak sensor.

With reference to FIG. 1, a schematic view of an example refrigeration (e.g., air conditioning) system 10 is shown including a compressor 12, a condenser 14, an expansion valve 16, and an evaporator 18 disposed inside of relative to the building.

A fan (or blower) 24 is provided adjacent to the evaporator 18 and blows air across the evaporator 18. A control module 26 controls operation (e.g., on, off, speed) of the fan 24. In various implementations, the building may additionally include a whole house fan, a ventilation system fan, an air exchange system fan, or another type of fan. The control module 26 also controls operation (e.g., on, off, speed, capacity) of the compressor 12.

The control module 26 can communicate with the compressor 12, the fan 24, and various sensors by wired or wireless communication directly or indirectly through another device or control module. The control module 26 can include one or more modules that can be in communication with one another and can be implemented as part of a control board, furnace board, thermostat, air handler board, contactor, or in another suitable manner.

The control module 26 may include power conditioning circuitry and supply power to electronic devices using 24 volts (V) alternating current (AC), 120-240 V AC, 5 V direct current (DC) etc. The control module 26 may include a bidirectional communication port which can be wired, wireless, or both, for example, for system debugging, programming, updating, monitoring, parameter value/state transmission, etc.

A refrigerant leak sensor 30 is provided adjacent to the evaporator 18 (e.g., at or near a midpoint of the evaporator 18 or at or near a bottom (lowest vertical point) of the evaporator 18). The refrigerant leak sensor 30 may be located in another suitable location. The leak sensor 30, as discussed in the present disclosure can be an infrared leak sensor, an optical leak sensor, a chemical leak sensor, a thermal conductivity leak sensor, an acoustic leak sensor, an ultrasonic leak sensor, or another suitable type of leak sensor.

In the example of FIG. 1, the control module 26 receives signals from the leak sensor 30 and determines if a leak is detected. The refrigeration system can further include additional mitigation devices such as a lockout device 32 that stop and lock out (e.g., prevent) operation of one or more ignition devices that are in the building when a leak is detected. Examples of ignition devices may include furnace and water heater igniters and pilot lights or other electronic devices that can create an electrical arc or ignite fire. The locking out of any ignition devices can be performed, for example, by the control module 26 deactivating electronic circuitry controlling the ignition device.

The leak sensor 30 may have a response lag between when an actual value changes and when the value measured by the leak sensor 30 changes. According to the present disclosure, leak sensors like the leak sensor 30 are tested to determine decay curves (e.g., equations corresponding to the decay curves) for the leak sensor 30 and is stored in the control module 26.

Figure 2:
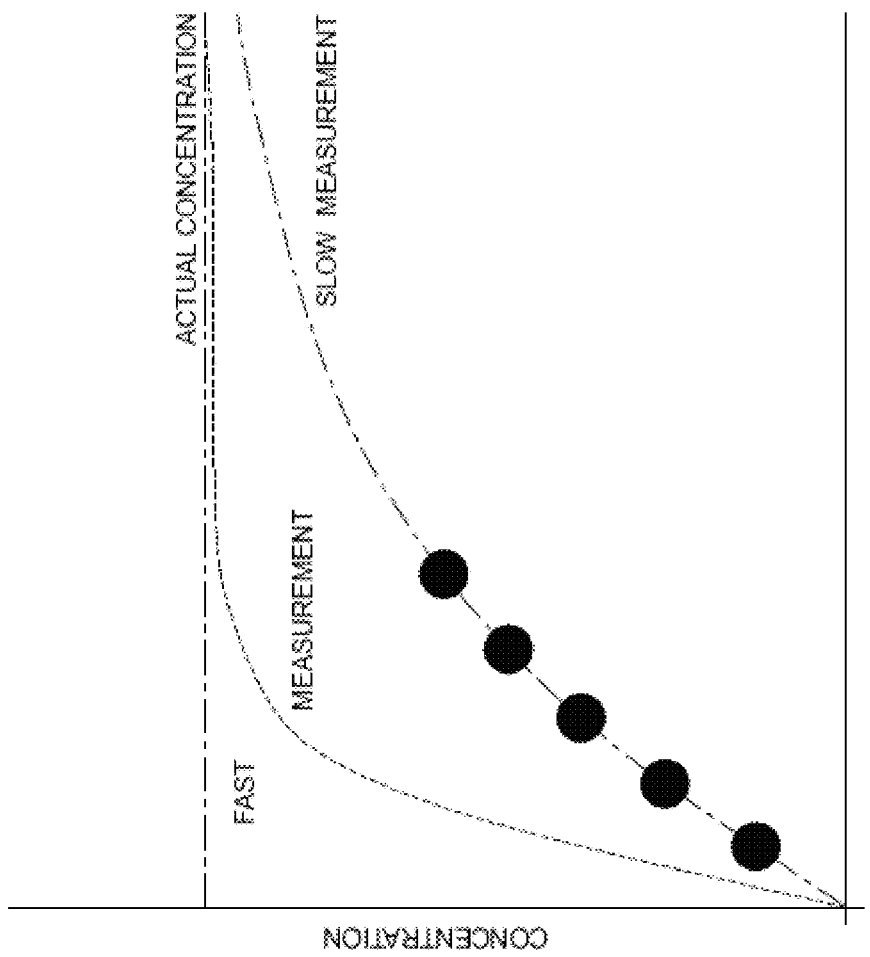
FIG. 2 is an example graph illustrating an example decay curve of leak sensor measurements verses time.

The control module 26 stores a plurality of decay curves representative of different actual concentration values. Example decay curves are provided in FIG. 2. Upon receiving an increasing measurement (e.g., an increase from a first measurement to a second measurement taken after the first measurement) from the leak sensor 30, the control module 26 matches the increase to a stored decay curve. In other words, the control module 26 selects a stored decay curve based on the increase (e.g., the one of the decay curves that increases most closely with the increase in the measurements).

The control module 26 estimates (determines) an actual concentration based on the increase and the selected stored decay curve. For example, the control module 26 may estimate the actual concentration by solving the equation for the selected decay curve with the (e.g., second) measurement or the increase.

Alternatively, the control module can store a decay calculation including, for example, the equation EQ-1:

Actual concentration=$(c(t)-c(t-1))/(1-(c(t)-c(t-1))/(c(t-1)-c(t-2))+c(t)$, where actual concentration is the actual concentration, $c(t)$ is the measured concentration at time t, $c(t-1)$ is the measured concentration at time t−1 (one time step before time t), and $c(t-2)$ is the measured concentration at time t−1 (two time steps before time t).

Knowing the relationship between measured and actual concentration allows the control module 26 to react quicker (and actuate the lockout device 32 to disable and inhibit ignition) when a leak is detected. One or more remedial actions may also be taken more quickly. For example, the control module 26 may turn the fan on 24 sooner than it otherwise would have. When the control module 26 detects a rising (increasing) measurement from the leak sensor 30, the control module 26 matches the data to a stored decay curve and estimates an actual concentration.

In HVAC systems, a fast response is important to help minimize the amount of and duration of refrigerant leaks. The response time of the sensor 30 is enhanced by using previously established data about the time response and measurement error decay of the sensor 30 in measurement processing to estimate the asymptote to quickly estimate the actual concentration from three or more measurements. In this regard, the control module 26 observes values or changes to the output of the leak sensor 30. The post-processed result of the sensed concentration is the estimated actual concentration.

If the estimated actual concentration exceeds a predetermined value, the control module 26 disables and inhibits operation of the compressor 12. In the example architecture as provided, when a leak is detected by the control module 26, the control module 26 can turn off the compressor 12 and maintain the compressor 12 off until the leak is remediated. The control module 26 may additionally turn ON the fan 24 for a predetermined period of time or until it is turned off. In addition, the control module 26 can also turn on any other mitigation devices in order to dissipate any leaked refrigerant and prevent/lockout operation of any ignition sources until they are reset.

Figure 3:
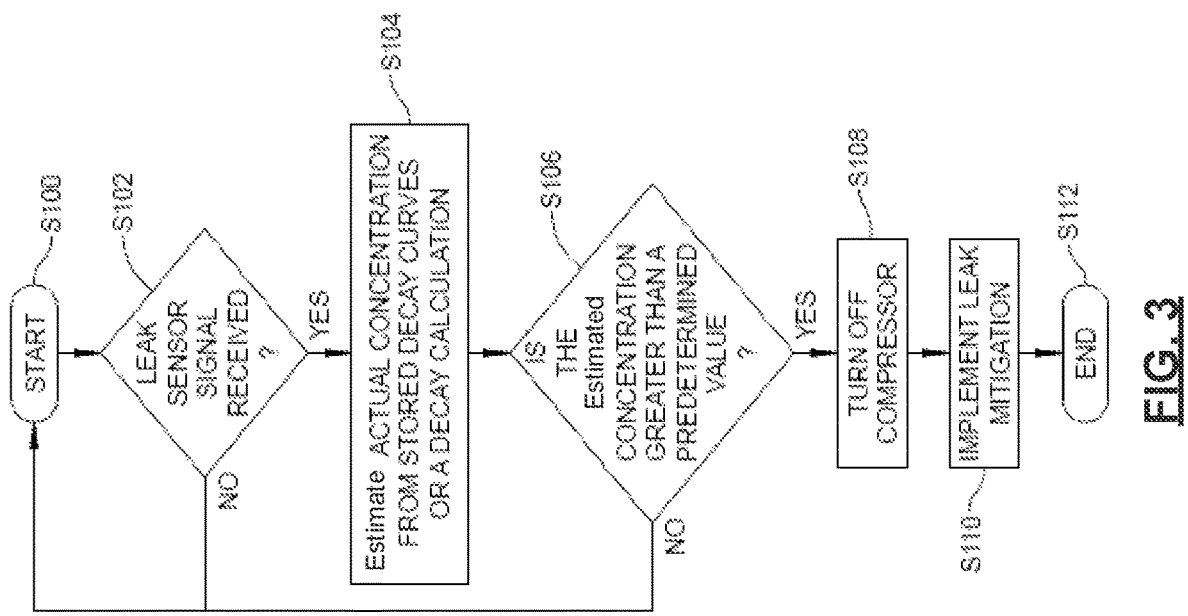
FIG. 3 is a flowchart depicting an example method of refrigerant leak detection and mitigation.

FIG. 3 is a flowchart depicting an example method of refrigerant leak detection and mitigation. Control begins with S100 and proceeds to S102. At S102, the control module 26 determines whether a measurement has been received from the leak sensor 30. The leak sensor 30 may take measurements at a predetermined rate (once every predetermined period, such as once per second or at another suitable rate).

If S102 is true, control continues with S104. If S102 is false, control may return to S100. At S104, the control module 26 estimates an actual concentration of refrigerant based on multiple measurements from the leak sensor 30 using a selected stored decay curve (e.g. and interpolation) or an equation (e.g., the equation provided above). Control proceeds to S106.

At S106, the control module 26 determines whether the estimated actual concentration is greater than a predetermined concentration. The predetermined concentration is calibrated and may be greater than zero. If S106 is true, the control module 26 determines that a leak is present, and control continues with S108.

At S108, the control module 26 turns off the compressor 12. The control module 26 may also take one or more other remedial actions, such as actuating the lockout device 32 to disable and inhibit ignition, turn on the fan 24, and generate one or more outputs (e.g., alerts). Control ends at S112.

Figure 4:
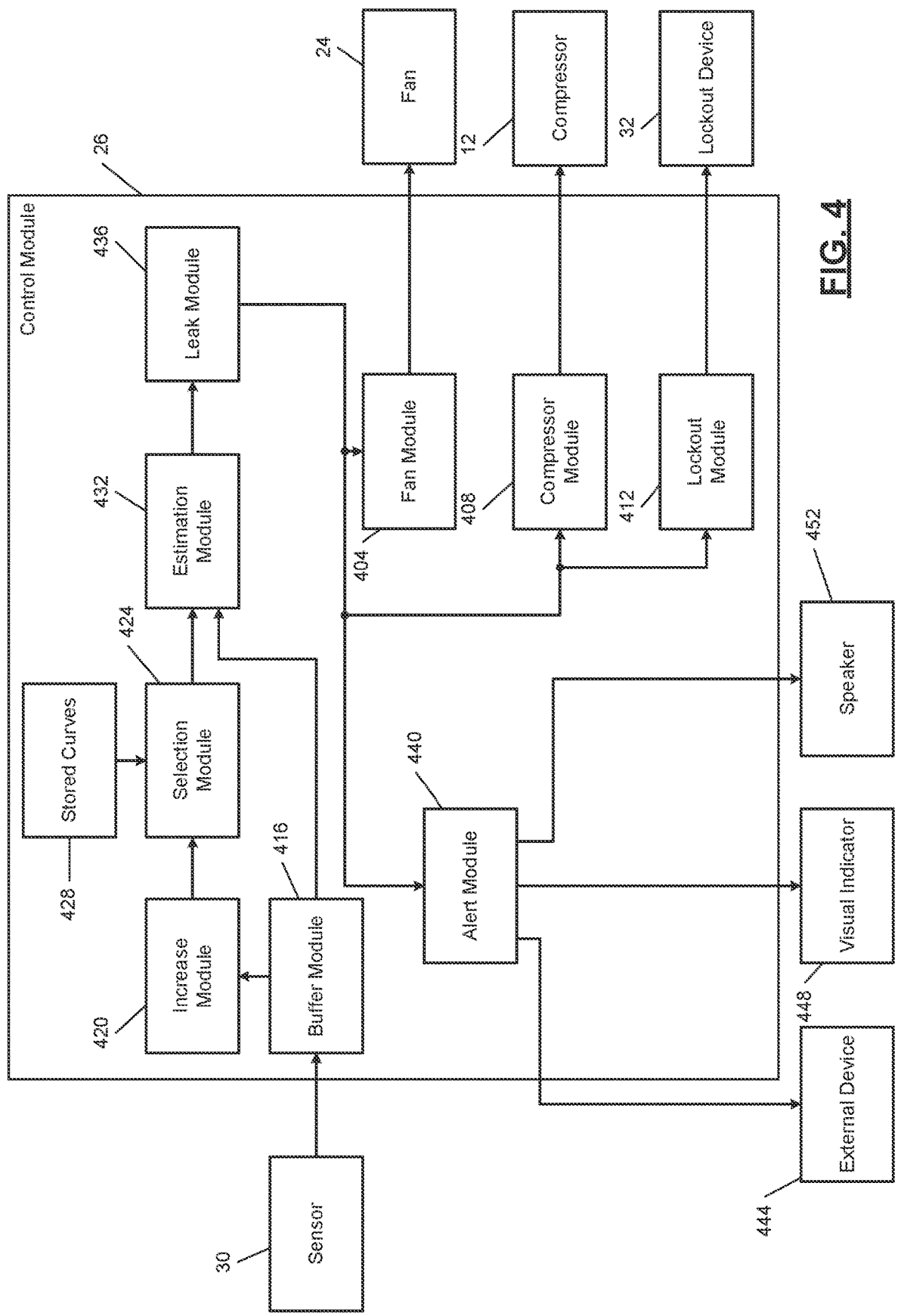
FIG. 4 is a functional block diagram of an example control system.

FIG. 4 is a functional block diagram of an example control system. A fan module 404 controls operation (e.g., on, off, speed) of the fan 24. A compressor module 408 controls operation (e.g., on, off, speed, capacity, etc.) of the compressor 12. A lockout module 412 controls actuation of the lockout device 32.

A buffer module 416 stores measurements from the leak sensor 30. The buffer module 416 may also store timestamps indicative of when the measurements were received (or taken). An increase module 420 determines an increase in the measurements, such as the most recently received measurement (c(t)) and the measurement received immediately before the most recently received measurement (c(t−1)). For example, the increase module 420 may subtract the measurement received immediately before the most recently received measurement (c(t−1)) from the most recently received measurement (c(t)) to determine the increase.

When the increase is positive, a selection module 424 may select one of a plurality of stored curves 428 that has an increase that most closely matches the increase in the measurements. A estimation module 432 may estimate the actual concentration (at time t) based on the increase using the selected one of the stored curves 428 (e.g., using interpolation).

In various implementations, when the increase is positive, the estimation module 432 may estimate actual concentration using a stored equation and multiple of the measurements (e.g., c(t), c(t−1), and c(t−2)) as inputs. An example equation is provided above.

A leak module 436 determines whether a leak is present (i.e., refrigerant is leaking from the refrigeration system within the building) based on the estimated actual concentration. Using the estimated actual concentration as opposed to the measurements from the leak sensor 30 may allow the leak module 436 to detect the presence of a leak more quickly than if the measurements were used. The leak module 436 may determine that a leak is present when the estimated actual concentration is greater than a predetermined concentration.

The leak module 436 generates a signal that indicates whether a leak is present. For example, the leak module 436 may set the signal to a first state when a leak is present and set the signal to a second state when a leak is not present.

One or more remedial actions may be taken when a leak is present. For example, the fan module 404 may turn on the fan 24 when a leak is present. Additionally, the compressor module 408 may turn off the compressor 12 and maintain the compressor 12 off until the leak is remediated (e.g., as indicated by the system being reset, such as by disconnecting the control module 26 from power for at least a predetermined period). Additionally, the lockout module 412 may actuate the lockout device 32 to prevent ignition by one or more ignition devices within the building. The lockout module 412 may maintain the state of the lockout device 32 for a predetermined period, such as to allow the refrigerant leak to dissipate.

Additionally, an alert module 440 may generate one or more indicators when a leak is present. For example, the alert module 440 may transmit an indicator to one or more external devices 444, generate one or more visual indicators 448 (e.g., turn on one or more lights, display information on one or more displays, etc.), and/or generate one or more audible indicators, such as via one or more speakers 452.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "control module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A refrigeration system, comprising:
   a leak sensor disposed within a building and configured to measure an amount of refrigerant that has leaked from the refrigeration system within the building;
   an estimation module configured to determine an estimated amount of refrigerant that has leaked from the refrigeration system within the building based on the measured amount; and
   a leak module configured to:
      determine whether a leak is present in the refrigeration system within the building based on the estimated amount of refrigerant that has leaked from the refrigeration system; and
      take one or more remedial actions when a leak is present in the refrigeration system within the building.

2. The refrigeration system of claim 1 wherein the estimation module is configured to determine the estimated amount of refrigerant that has leaked from the refrigeration system within the building using an equation that relates multiple of the measured amounts from the leak sensor to the estimated amount of refrigerant that has leaked.

3. The refrigeration system of claim 2 wherein the multiple measured amounts include at least three measured amounts from at least three different times, respectively.

4. The refrigeration system of claim 1 wherein the estimation module is configured to determine the estimated amount of refrigerant that has leaked from the refrigeration system within the building using a stored curve that relates at least one measured amount from the leak sensor to the estimated amount of refrigerant that has leaked.

5. The refrigeration system of claim 4 further comprising a selection module configured to select the stored curve from a plurality of different stored curves.

6. The refrigeration system of claim 5 wherein the selection module is configured to select the stored curve from the plurality of different stored curved based on an increase in the measured amount of refrigerant that has leaked from the refrigeration system within the building.

7. The refrigeration system of claim 1 wherein the leak module is configured to determine that a leak is present in the refrigeration system within the building when the estimated amount of refrigerant is greater than a predetermined amount.

8. The refrigeration system of claim 1 wherein the leak module is configured to turn on a fan disposed within the building when a leak is present in the refrigeration system within the building.

9. The refrigeration system of claim 1 wherein the leak module is configured to turn off a compressor of the refrigeration system when a leak is present in the refrigeration system within the building.

10. The refrigeration system of claim 1 wherein the leak module is configured to actuate an interlock device and inhibit ignition by one or more components when a leak is present in the refrigeration system within the building.

11. The refrigeration system of claim 1 wherein the refrigerant has an American Society of Heating, Refrigerating and Air-Conditioning Engineers (ASHRAE) classification of A2L.

12. A refrigeration method, comprising:
    receiving, from a leak sensor disposed within a building, a measured amount of refrigerant that has leaked from a refrigeration system within the building;
    determining an estimated amount of refrigerant that has leaked from the refrigeration system within the building based on the measured amount;
    determining whether a leak is present in the refrigeration system within the building based on the estimated amount of refrigerant that has leaked from the refrigeration system; and
    executing one or more remedial actions when a leak is present in the refrigeration system within the building.

13. The refrigeration method of claim 12 wherein the determining the estimated amount includes determining the estimated amount of refrigerant that has leaked from the refrigeration system within the building using an equation that relates multiple of the measured amounts from the leak sensor to the estimated amount of refrigerant that has leaked.

14. The refrigeration method of claim 13 wherein the multiple measured amounts include at least three measured amounts from at least three different times, respectively.

15. The refrigeration method of claim 12 wherein the determining the estimated amount includes determining the estimated amount of refrigerant that has leaked from the refrigeration system within the building using a stored curve that relates at least one measured amount from the leak sensor to the estimated amount of refrigerant that has leaked.

16. The refrigeration method of claim 15 further comprising selecting the stored curve from a plurality of different stored curves.

17. The refrigeration method of claim 16 wherein the selecting includes selecting the stored curve from the plurality of different stored curves based on an increase in the measured amount of refrigerant that has leaked from the refrigeration system within the building.

18. The refrigeration method of claim 12 wherein the determining whether a leak is present includes determining that a leak is present in the refrigeration system within the building when the estimated amount of refrigerant is greater than a predetermined amount.

19. The refrigeration method of claim 12 wherein the executing one or more remedial actions includes turning on a fan disposed within the building when a leak is present in the refrigeration system within the building.

20. The refrigeration method of claim 12 wherein the executing one or more remedial actions includes at least one of:
   turning off a compressor of the refrigeration system when a leak is present in the refrigeration system within the building; and
   actuating an interlock device and inhibit ignition by one or more components when a leak is present in the refrigeration system within the building.

\* \* \* \* \*